United States Patent
Hsieh et al.

(10) Patent No.: US 8,059,204 B2
(45) Date of Patent: Nov. 15, 2011

(54) METHOD AND APPARATUS FOR ADJUSTING A SATURATION LEVEL OF ORIGINAL IMAGE DATA

(75) Inventors: Chun-Hsing Hsieh, Hsin Chu (TW); Chia-Hui Kuo, Chu Pei (TW)

(73) Assignee: Realtek Semiconductor Corp., Hsinchu (TW)

( * ) Notice: Subject to any disclaimer, the term of this patent is extended or adjusted under 35 U.S.C. 154(b) by 1197 days.

(21) Appl. No.: 11/806,931

(22) Filed: Jun. 5, 2007

(65) Prior Publication Data

US 2008/0018797 A1    Jan. 24, 2008

(30) Foreign Application Priority Data

Jun. 6, 2006   (TW) ................................ 95119955 A

(51) Int. Cl.
*H04N 9/68* (2006.01)
(52) U.S. Cl. .................... 348/645; 348/646; 348/703
(58) Field of Classification Search .................. 382/172; 348/256, 645–648, 703
See application file for complete search history.

(56) References Cited

U.S. PATENT DOCUMENTS

| 4,106,054 | A | 8/1978 | Tzakis |
| RE32,148 | E | 5/1986 | Avins et al. |
| 5,450,217 | A | 9/1995 | Eschbach et al. |
| 6,868,179 | B2 | 3/2005 | Gruzdev et al. |
| 7,903,178 | B1 * | 3/2011 | Balram et al. ............... 348/649 |
| 2003/0098914 | A1 * | 5/2003 | Easwar ...................... 348/229.1 |
| 2004/0013298 | A1 * | 1/2004 | Choe et al. .................. 382/167 |
| 2006/0038208 | A1 * | 2/2006 | Terzioglu et al. ............ 257/292 |
| 2006/0268180 | A1 * | 11/2006 | Chou ........................... 348/673 |
| 2009/0207265 | A1 * | 8/2009 | Gough ...................... 348/222.1 |

FOREIGN PATENT DOCUMENTS

| JP | 2002-278522 | 9/2002 |
| JP | 2003-309732 | 10/2003 |
| JP | 2006-092168 | 4/2006 |

* cited by examiner

*Primary Examiner* — Andrew Koenig
*Assistant Examiner* — Junior Mendoza
(74) *Attorney, Agent, or Firm* — Muncy, Geissler, Olds & Lowe, PLLC

(57) ABSTRACT

An apparatus for adjusting image color saturation and a method for adjusting a saturation level of an original image data are provided. The image color saturation apparatus includes a first color over-saturation level calculating unit, a parameter adjusting unit, a saturation adjusting unit and a second color over-saturation level calculating unit. The apparatus for adjusting image color saturation detects the number of over-saturation pixels in an input image according to a predefined over-saturation area, and the number of over-saturation pixels in an adjusted output image. Thus, the parameter adjusting unit can dynamically adjust a saturation gain to maintain the frame consistency according to the number of the over-saturation pixels.

18 Claims, 4 Drawing Sheets

METHOD AND APPARATUS FOR ADJUSTING A SATURATION LEVEL OF ORIGINAL IMAGE DATA

BACKGROUND OF THE INVENTION

This application claims the benefit of the filing date of Taiwan Application Ser. No. 095119955, filed on Jun. 6, 2006, the content of which is incorporated herein by reference.

FIELD OF INVENTION

The invention relates to an image detecting and adjusting apparatus, and more particularly to an image processing apparatus for processing the color saturation.

RELATED ART

Image color saturation adjusting processes are applied to a digital display interface, such as a television (TV), an image signal interface, a digital still camera (DSC), a scanner, a printer, a monitor, a video audio system or a multimedia system, to adjust the image color saturation of the interface. Typically, adjusting the image color saturation is performed by using the average saturation as the standard or by adopting the chroma histogram to serve as a basis for adjusting the saturation of the input image. However, the contents of the image may contain any arbitrary frame, which may be a frame with a higher saturation or a lower saturation. If no reliable saturation detector is used, the fixed color saturation setting value may be only suitable for some particular frames. When the frame is switched, the fixed setting value cannot be simultaneously suitable for the image with different frame levels, thereby causing the inconsistency of the image saturation and the distorted output image.

Thus, it is essential to provide an apparatus with dynamically adjusting and detecting the frame saturation to obtain the consistency in the image saturation.

SUMMARY OF THE INVENTION

It is therefore an object of the invention to provide an apparatus for dynamically adjusting color saturation to obtain the consistent saturation of the output image.

To achieve the above-identified objects and others, an apparatus for adjusting image color saturation provided by the present invention includes a first color over-saturation level calculating unit, a parameter adjusting unit, a saturation adjusting unit and a second color over-saturation level calculating unit. The first color over-saturation level calculating unit first receives image input data and calculates the number of pixels of the image input data located in a predefined over-saturation area to serve as an original over-saturation level according to the predefined over-saturation area. Then, the parameter adjusting unit generates a color saturation adjusting parameter according to the original over-saturation level and a feedback over-saturation level. Then, the saturation adjusting unit adjusts color saturation of the image input data according to the color saturation adjusting parameter and outputs the adjusted image data.

This invention calculates the number of pixels of an input image signal located in a predetermined over-saturation region to determine whether the gain has to be increased or decreased. Thus, the output effect closer to the original color saturation can be obtained, and the frame consistency can be maintained.

DETAILED DESCRIPTION OF THE INVENTION

The apparatus and method for adjusting image color saturation according to the invention will be described with reference to the accompanying drawings.

Figure 1:
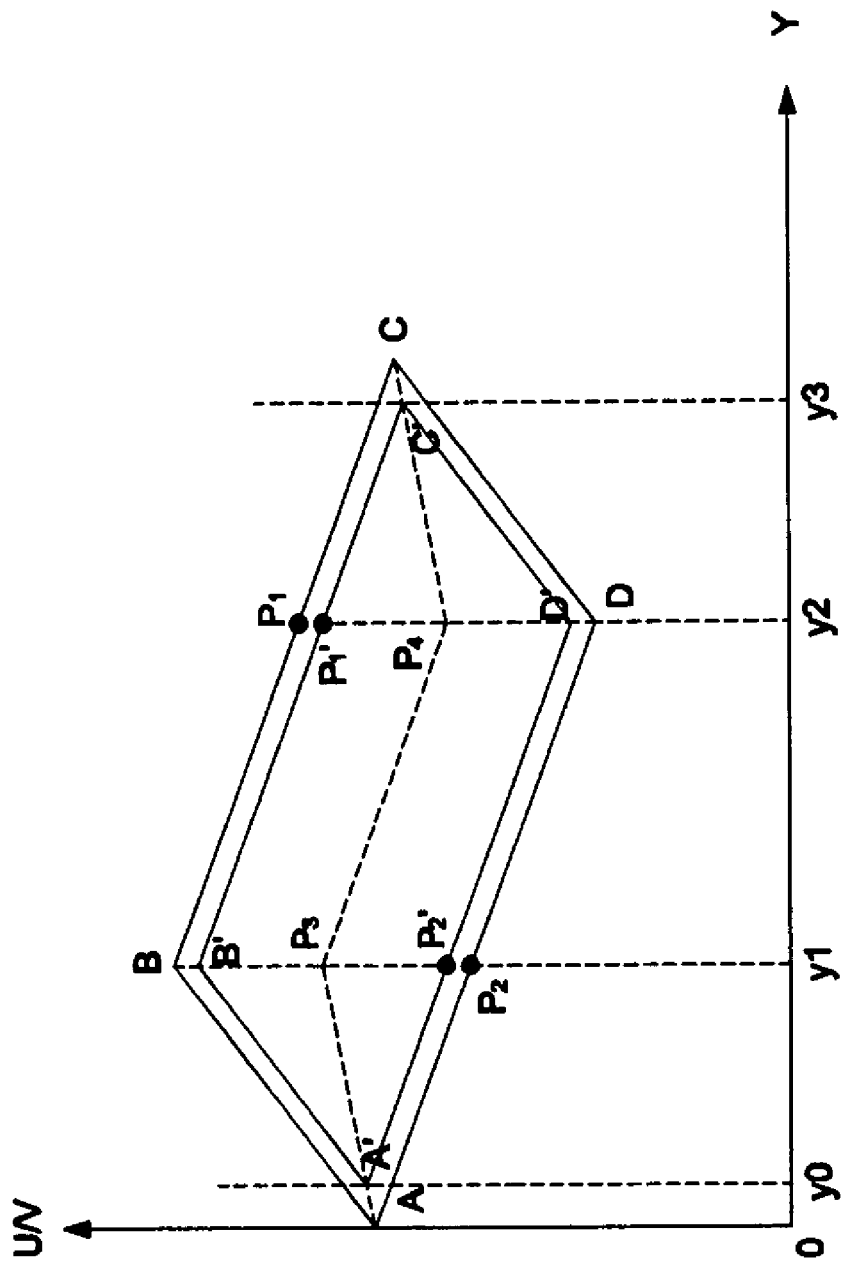
FIG. 1 shows a region identifying over-saturation and non over-saturation in YUV domain.

FIG. 1 shows a region identifying over-saturation and non over-saturation in YUV domain. As shown in FIG. 1, when an image is converted from a RGB color coordinate into a YUV color coordinate, the distribution of the YUV image falls within a tetragonal shape ABCD, wherein the vertical axis represents the U/V chrominance value and the horizontal axis represents the Y luminance value. Typically, after the RGB image is converted into the YUV image, the pixel distribution of the YUV image does not exceed the boundary of the tetragonal shape ABCD, and the pixel closer to the boundary of the tetragonal shape ABCD is more saturated. In order to adjust the saturation properly, a smaller tetragonal shape A'B'C'D' is defined in the embodiment of the present invention. The pixel located out of the tetragonal shape A'B'C'D' serves as an over-saturation pixel, and the number of the over-saturation pixels serves as a first count value. The number of over-saturation pixels will be increased or decreased if adjusted by a color saturation adjusting apparatus, and the number of over-saturation pixels is calculated to serve as a second count value. The color saturation adjusting apparatus adjusts a saturation adjusting parameter according to the two count values. Therefore, as long as the number of over-saturation pixels is controlled within a predetermined range, it is possible to prevent the over-saturation or under-saturation occurs. The color saturation adjusting apparatus of the present invention is not restricted to the distribution of the YUV image, but may also be applied to any other coordinate system, such as a HSI image coordinate system.

Figure 2:
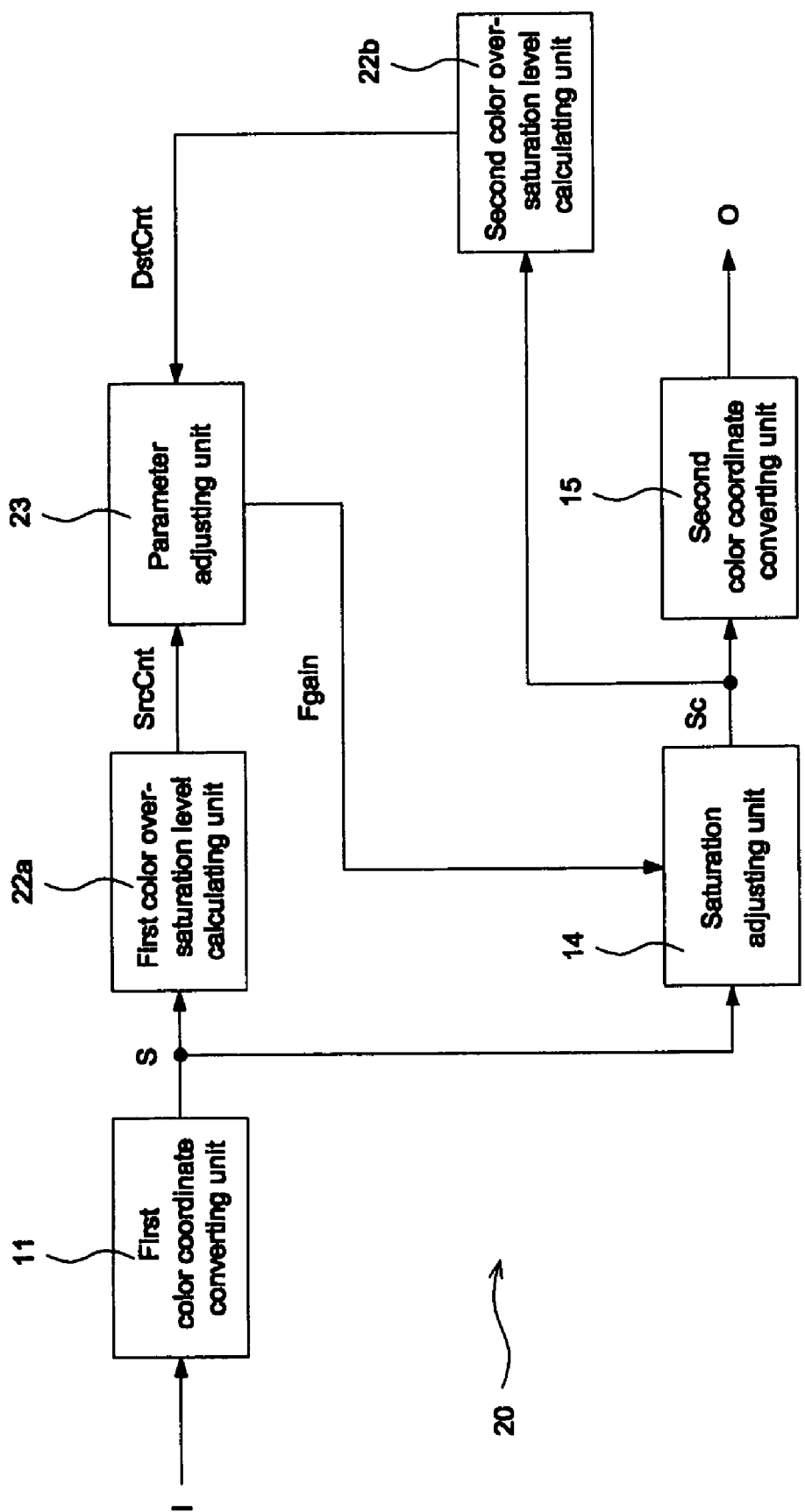
FIG. 2 is a block diagram of adjusting color saturation apparatus according to one embodiment of the present invention.

FIG. 2 is a block diagram showing of adjusting color saturation apparatus according to an embodiment of the present invention. Referring to FIG. 2, the color saturation adjusting apparatus 20 includes a first color coordinate converting unit 11, a first color over-saturation level calculating unit 22a, a parameter adjusting unit 23, a saturation adjusting unit 14, a second color over-saturation level calculating unit 22b and a second color coordinate converting unit 15. The operations of the first color coordinate converting unit 11, the saturation adjusting unit 14 and the second color coordinate converting unit 15 are use to perform a conversion from one color domain to another domain. For example, the first color coordinate converting unit performs RGB to YUV conversion and the second color coordinate converting unit performs YUV to RGB conversion, etc. Accordingly, the first color saturation level calculating unit 22a receives YUV image data S and calculates the number of pixels of the YUV image data located in the predetermined over-saturation region, wherein the predetermined over-saturation region in one embodiment is between outside the tetragonal shape A'B'C'D' boundary and inside the tetragonal shape ABCD boundary, to serve as an original over-saturation level SrcCnt (first count value). The parameter adjusting unit 23 receives the original over-saturation level SrcCnt and a feedback over-saturation level DstCnt (second count value) and generates a color saturation adjusting parameter Fgain according to the aforementioned two over-saturation levels. Thereafter, the saturation adjusting unit 14 receives the color saturation adjusting parameter Fgain and adjusts the color saturation of the YUV image data S according to the color saturation adjusting parameter Fgain to thereby generate an adjusted YUV image data Sc. Finally, the second color coordinate converting unit 15 converts the adjusted YUV image data Sc into a RGB image and outputs the RGB image. On the other hand, the second color over-saturation level calculating unit 22b receives the adjusted YUV image data Sc and further calculates the number of pixels of the adjusted YUV image data in the predetermined over-saturation to obtain the feedback over-saturation level DstCnt.

The methods for calculating the over-saturation levels in the first color over-saturation level calculating unit 22a and the second color over-saturation level calculating unit 22b are the same. As shown in FIG. 1, when a y value of a pixel is smaller than y0 or greater than y3, the pixel is regarded as the over-saturation pixel. When the y value of the pixel is between y0 and y1, two U/V values of line segments $\overline{A'B'}$ and $\overline{A'P_2'}$ can be calculated according to the y value of the pixel. As long as the U/V value of the pixel exceeds the calculated ranges of the calculated two U/V values, the pixel is regarded as the over-saturation pixel. When the y value of the pixel is between y1 and y2, the U/V value of the line segment $\overline{P_3'P_4'}$ can be calculated according to the y value of the pixel. As long as the U/V value of the pixel exceeds the calculated U/V±Offset, the pixel is regarded as the over-saturation pixel, wherein the aforementioned Offset represents the distance from P3 to B'. When the y value of the pixel is between y2 and y3, two U/V values of the line segments $\overline{P_1'C'}$ and $\overline{D'C'}$ can be calculated according to the y value of the pixel. As long as the U/V value of the pixel exceeds the calculated range of the two U/V values, the pixel is regarded as the over-saturation pixel. Consequently, as long as the equation of each line segment is well defined, the number of pixels in the over-saturation area can be calculated precisely.

The parameter adjusting unit 23 of the embodiment of the present invention can generate the saturation adjusting parameter Fgain according to the original over-saturation level SrcCnt as well as the feedback over-saturation level DstCnt. For example, the color saturation adjusting parameter Fgain is increased when the original over-saturation level SrcCnt is lower than a first over-saturation threshold value, and the color saturation adjusting parameter Fgain is further increased when the feedback over-saturation level DstCnt of the second color over-saturation level calculating unit 22b is lower than a first threshold over-saturation level. On the contrary, the color saturation adjusting parameter Fgain is reduced when the over-saturation level SrcCnt received by the parameter adjusting unit 23 is higher than a second threshold over-saturation level, and the color saturation adjusting parameter Fgain is further reduced when the feedback over-saturation level DstCnt is higher than the second threshold over-saturation level. In addition, it is also possible to adjust the parameter Fgain according to the difference or times between the feedback over-saturation level DstCnt and the original over-saturation level SrcCnt. For example, the parameter Fgain is reduced when the difference or times is greater than a threshold value; and the parameter Fgain is increased when the difference or times is smaller than the threshold value.

Figure 3:
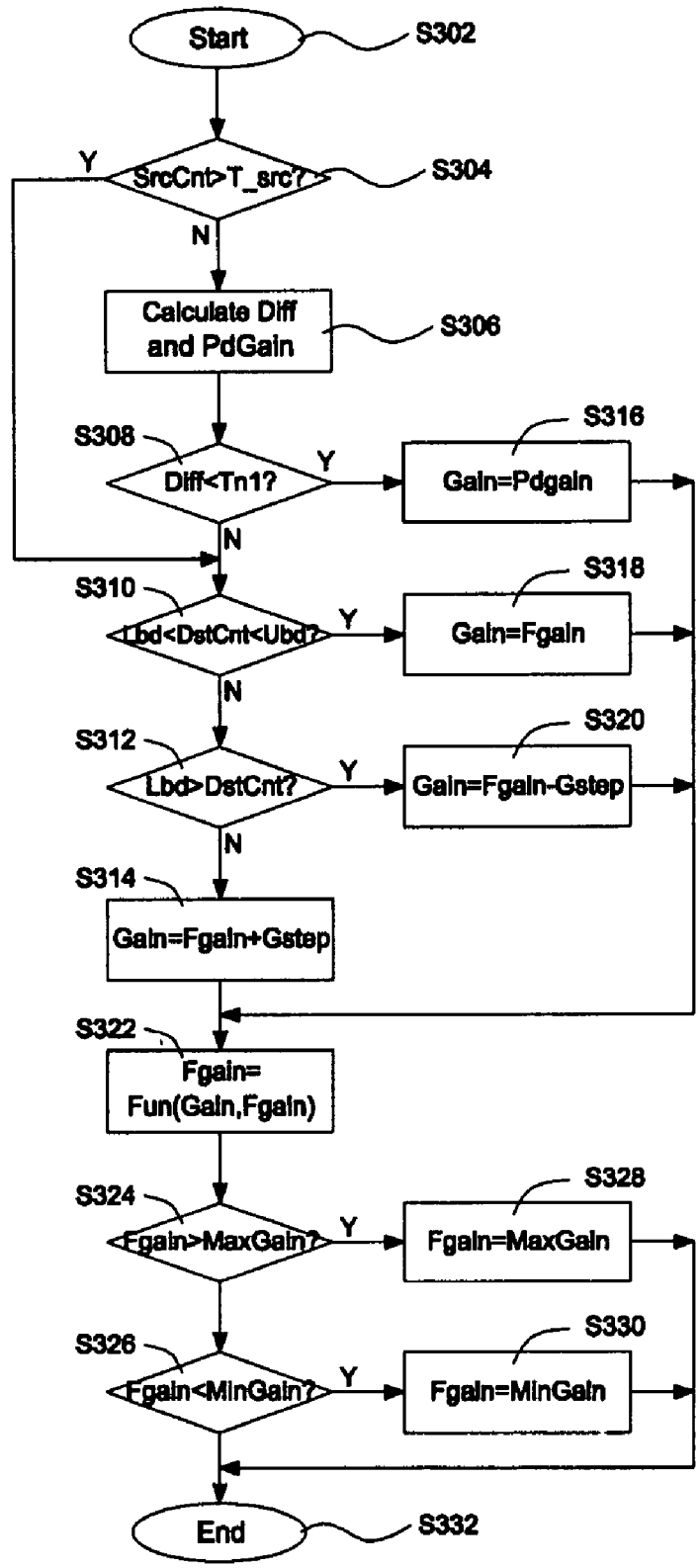
FIG. 3 is a flow chart of adjusting a saturation gain in the parameter adjusting unit according to one embodiment of the present invention.

FIG. 3 is a flow chart of adjusting a saturation gain in the parameter adjusting unit according to one embodiment of the present invention. Referring to FIG. 3, the parameter adjusting unit 23 reads the original over-saturation level SrcCnt outputted from the first color over-saturation level calculating unit 22a and the feedback over-saturation level DstCnt outputted from the second color over-saturation level calculating unit 22b for adjusting and outputting the saturation gain Fgain.

Step S302: start.

Step S304: determine whether the original over-saturation level SrcCnt is greater than a maximum image pixel number T_src. If the original over-saturation level SrcCnt is greater than the maximum pixel number T_src, perform the step S312 or otherwise perform the next step S306.

Step S306: calculate the difference Diff between the feedback over-saturation level DstCnt and the original over-saturation level SrcCnt and calculate the predetermined gain PdGain.

$$Diff = DstCnt - SrcCnt$$

$$Pd\text{Gain} = MinGain + Diff * AdG$$

Step S308: determine whether the difference Diff is smaller than a noise threshold value Tn1. If the difference Diff is smaller than the noise threshold value Tn1, perform the step S316 or otherwise perform the next step S310.

Step S310: determine whether the feedback over-saturation level DstCnt ranges between a lower bound Lbd and an upper bound Ubd. If the feedback over-saturation level DstCnt ranges between the lower bound Lbd and the upper bound Ubd, perform the step S318 or otherwise perform the next step S312.

Step S312: determining whether the feedback over-saturation level DstCnt is smaller than the lower bound Lbd. If the feedback over-saturation level DstCnt is smaller than the lower bound Lbd, perform step S320 or otherwise perform the next step S314.

Step S314: calculate the reference gain Gain and jumps to step S322, wherein Gstep is a gain step value.

$$Gain = F\text{gain} + G\text{step}$$

Step S316: calculate the reference gain Gain and jumps to step S322.

$$Gain = Pd\text{Gain}$$

Step S318: calculate the reference gain Gain and jumps to step S322.

$$Gain = F\text{gain}$$

Step S320: calculate the reference gain Gain and jumps to step S322.

$$Gain = F\text{gain} - G\text{step}$$

Step S322: calculate the current gain Fgain according to the previous gain Fgain and the reference gain Gain.

$$F\text{gain} = Fun(Gain, F\text{gain})$$

Step S324: determine whether the gain Fgain is greater than a maximum gain MaxGain. If the gain Fgain is greater than the maximum gain MaxGain, perform the step S328 or otherwise perform the next step S326.

Step S326: determine whether the gain Fgain is smaller than a minimum gain MinGain. If the gain Fgain is smaller than the minimum gain MinGain, perform the step S330 or otherwise perform the next step S332.

Step S328: setting the gain Fgain as the maximum gain MaxGain and perform the step S332.

Step S330: setting the gain Fgain as the minimum gain MinGain and perform the step S332.

Step S332: end.

Consequently, according to the above-mentioned method, the color saturation adjusting apparatus of the embodiment of the present invention can simultaneously adjust the saturation gain according to the original over-saturation level SrcCnt outputted from the first color over-saturation level calculating unit 22a and the feedback over-saturation level DstCnt outputted from the second color over-saturation level calculating unit 22b.

Figure 4:
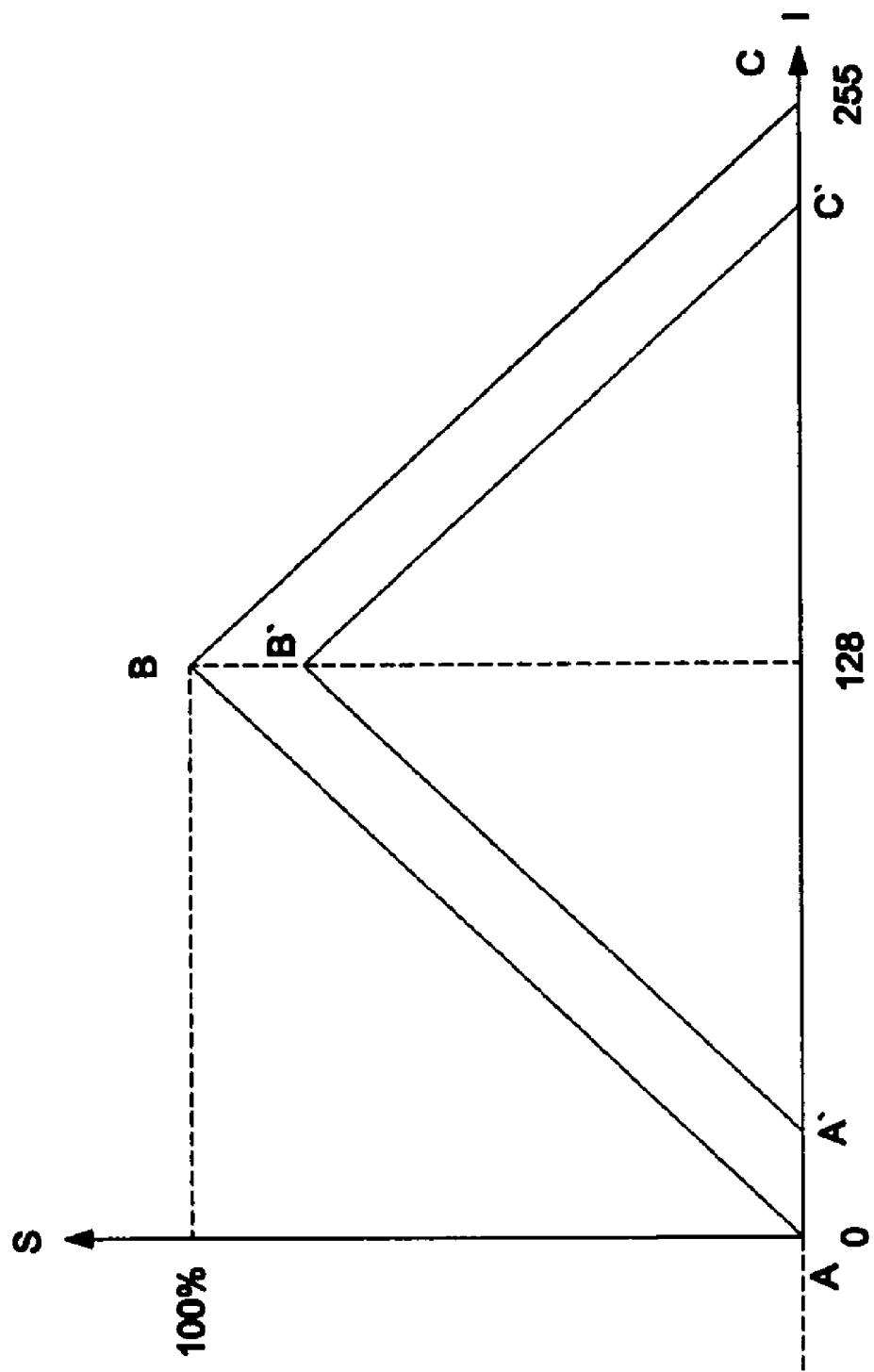
FIG. 4 shows a region identifying over-saturation and non over-saturation in HSI domain.

FIG. 4 shows a region identifying over-saturation and non over-saturation in HSI domain, wherein the horizontal axis I represents the luminance, the vertical axis S represents the saturation, and the luminance I ranges between 0 and 255. As shown in this drawing, when the image is converted from the RGB color coordinate into the HSI color coordinate, the distribution of the HSI image falls within the triangular ABC. Typically, after the RGB image is converted into the HSI image, the pixel distribution of the HSI image does not exceed the triangular ABC. However, if the HSI image encounters the over-saturation adjustment, some pixels may exceed the triangular ABC. As mentioned above, a triangular A'B'C' is firstly set. The pixel located outside the triangular A'B'C' serves as the over-saturation pixel, and the color saturation adjusting apparatus of the embodiment of the present invention adjusts the gain Fgain according to the number of pixels outside the triangular A'B'C' before the image adjustment and the number of pixels outside the triangular A'B'C' after the image adjustment. Consequently, it is possible to prevent the over-saturation or under-saturation occurs as long as the number of over-saturation pixels can be controlled within a desired range.

While certain exemplary embodiments have been described and shown in the accompanying drawings, it is to be understood that such embodiments are merely illustrative of and not restrictive on the broad invention, and that this invention not be limited to the specific construction and arrangement shown and described, since various other modifications may occur to those ordinarily skilled in the art.

What is claimed is:

1. A color saturation adjusting apparatus, comprising:
a first calculating unit, for calculating the number of pixels of a first image located in a predetermined region and generating a first count value;
a parameter adjusting unit, for generating an adjusting parameter according to the first count value and a second count value;
a saturation adjusting unit, for adjusting the saturation of the first image and outputting a second image according to the adjusting parameter; and
a second calculating unit, for calculating the number of pixels of the second image located in the predetermined region and generate a third count value;
wherein when a difference between the second count value and the first count value is greater than a threshold value, the parameter adjusting unit reduces the adjusting parameter.

2. The color saturation adjusting apparatus according to claim 1, wherein the predetermined region represents an over-saturation region.

3. The color saturation adjusting apparatus according to claim 1, further comprising:
a first color coordinate converting unit, for converting an input image into the first image according to a first color converting function;
a second color coordinate converting unit, for converting the second image into an output image according to a second color converting function;
wherein the first color converting function and the second converting function are complementary.

4. The color saturation adjusting apparatus according to claim 3, wherein the first and second images correspond to a YUV coordinate system.

5. The color saturation adjusting apparatus according to claim 3, wherein the first and second images correspond to a HSI coordinate system.

6. The color saturation adjusting apparatus according to claim 1, wherein the predetermined region performs a tetragon in a YUV coordinate system.

7. The color saturation adjusting apparatus according to claim 1, wherein when the second count value is greater than a first threshold value, the parameter adjusting unit reduces the adjusting parameter.

8. The color saturation adjusting apparatus according to claim 1, wherein when the second count value is smaller than a second threshold value, the parameter adjusting unit increases the adjusting parameter.

9. The color saturation adjusting apparatus according to claim 1, wherein when a time between the second count value and the first count value is greater than a threshold value, the parameter adjusting unit reduces the adjusting parameter.

10. A color saturation adjusting method, comprising the steps of:
setting a predetermined region;
calculating the number of pixels of a first image located in the predetermined region to serve as a first count value;
generating an adjusting parameter according to the first count value and a second count value;
adjusting the saturation of the first image according to the adjusting parameter and outputting a second image; and
calculating the number of pixels of the second image located in the predetermined region to serve as a third count value;
wherein when a difference between the second count value and the first count value is greater than a threshold value, the adjusting parameter is reduced.

11. The method according to claim 10, wherein the predetermined region is an over-saturation region.

12. The method according to claim 11, further comprising:
converting an input image to thereby generate the first image according to a first color coordinate converting function; and converting the second image to thereby generate an output image according to a second color coordinate converting function;

wherein the first color converting function and the second converting function are complementary.

13. The method according to claim 12, wherein the first and second images correspond to a YUV coordinate system.

14. The method according to claim 12, wherein the first and second images correspond to a HSI coordinate system.

15. The method according to claim 10, wherein the predetermined region performs a tetragon in a YUV coordinate system.

16. The method according to claim 10, wherein when the second count value is greater than a first threshold value, the adjusting parameter is reduced.

17. The method according to claim 10, wherein when the second count value is smaller than a second threshold value, the adjusting parameter is increased.

18. The method according to claim 10, wherein when a time between the second count value and the first count value is greater than a threshold value, the adjusting parameter is reduced.

* * * * *